Aug. 22, 1950 W. J. KRESKE 2,519,381
SELECTIVE AUTOMATIC TEMPERATURE
CONTROL FOR FLUID MIXTURES
Filed Nov. 19, 1945 5 Sheets-Sheet 1

Inventors:
Walter J. Kreske.
by Emery, Booth, Townsend, Miller & Widner
Attys

Aug. 22, 1950     W. J. KRESKE     2,519,381
SELECTIVE AUTOMATIC TEMPERATURE
CONTROL FOR FLUID MIXTURES

Filed Nov. 19, 1945     5 Sheets-Sheet 5

Inventor:
Walter J. Kreske,
by Emery, Booth, Townsend, Miller & Weidner
Attys

Patented Aug. 22, 1950

2,519,381

UNITED STATES PATENT OFFICE 2,519,381

SELECTIVE AUTOMATIC TEMPERATURE CONTROL FOR FLUID MIXTURES

Walter J. Kreske, Terryville, Conn.

Application November 19, 1945, Serial No. 629,439

12 Claims. (Cl. 236—12)

My present invention relates to temperature regulation of the flow of fluid mixtures, such as hot and cold water at a common outlet. It aims to provide improved methods and means involving novel application of a servo principle whereby energy derived from the fluid itself automatically affords accurate and reliable preselective temperature control of the mixture, and further to provide compact, readily manufactured and otherwise improved devices for the purpose indicated.

These and other objects and advantages of the invention will be apparent from the following description in connection with the accompanying drawings illustrating one exemplary embodiment of the invention, wherein:

Fig. 3a is a fragmentary view corresponding to the upper central part of Fig. 3, showing a modification;

Figure 1:
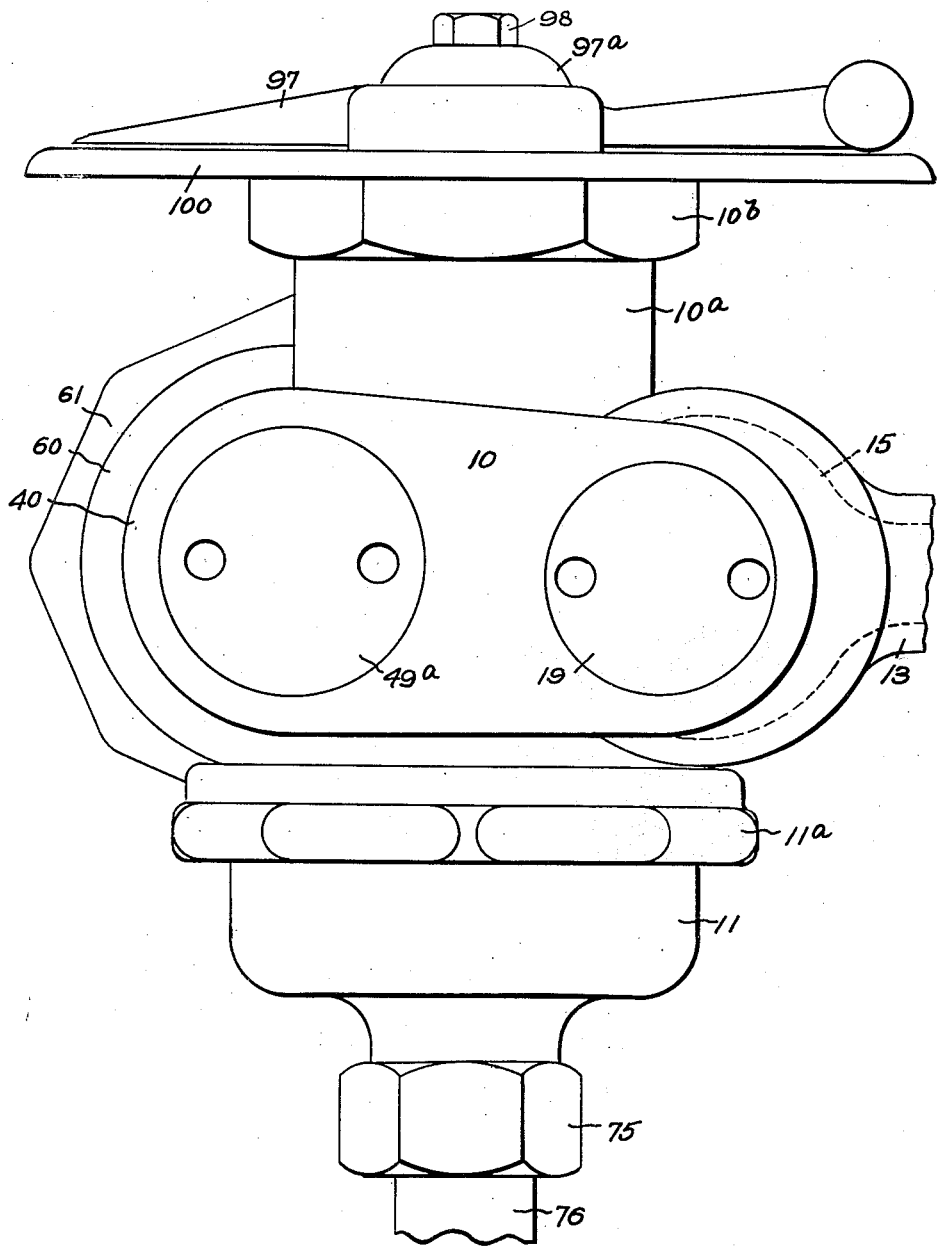
Fig. 1 is a side elevation of a regulatory mixing device or unit as a whole.

Referring to the drawings in more detail, the exemplary device comprises a main body or casing 10 desirably integrally formed as by molding or casting. Detachably secured to it is a lower shell 11, these two parts together providing the major support and housing for the several operatively associated elements to be described. The body 10 has plural inlets as at 12, 13 for fluids separately supplied under pressure and at different temperatures generally subject to variation. The inlets are adapted for connection with supply sources such as the usual hot and cold water mains; see particularly Figs. 2, 4 and 5. The designations "hot" and "cold" in the description and drawings are arbitrary and merely for convenience in description, their relative location being immaterial as regards the operation of the device as a whole. The inlets 12, 13 respectively admit to annular distributing passages 14, 15 in the body 10, between the latter and an inserted sleeve 16 defining a pressure-equalizing chamber of elongated cylindrical form closed at the ends as by threaded plugs 18, 19.

Figure 4:
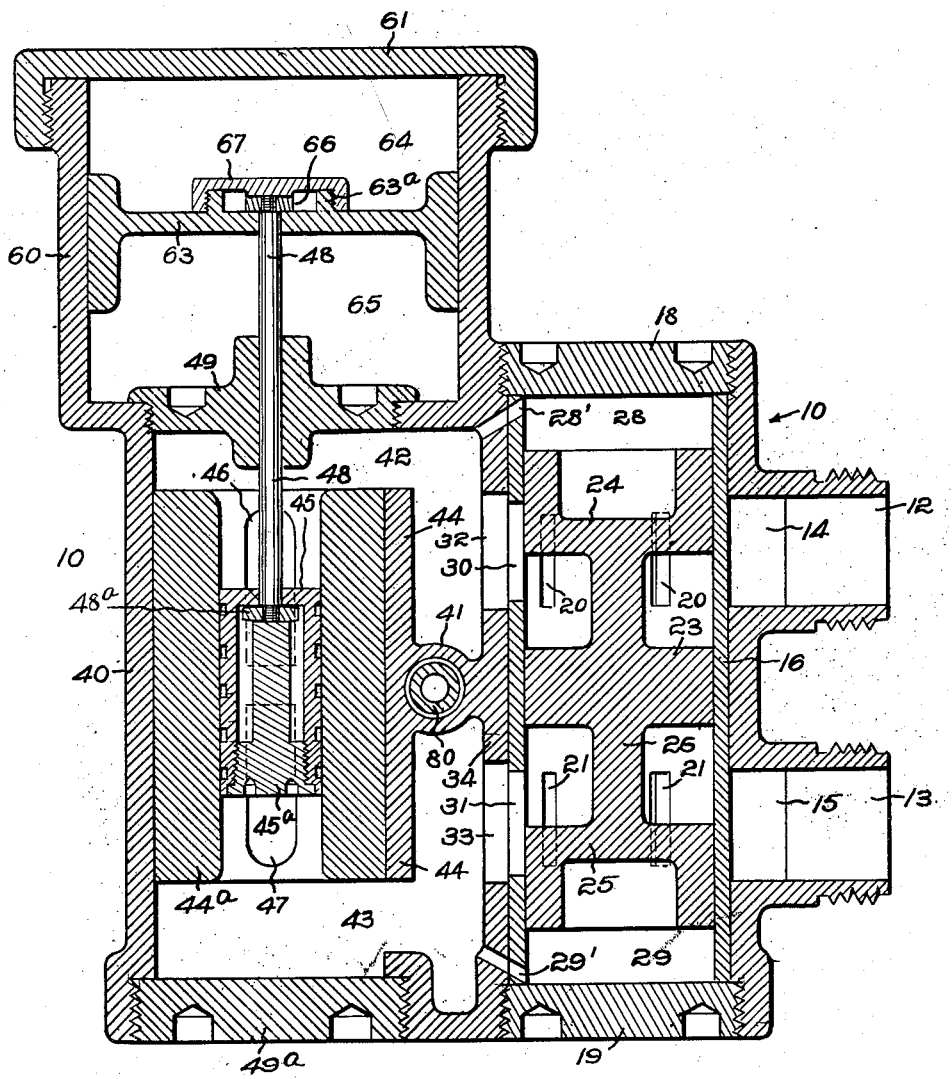
Fig. 4 is a substantially central horizontal section, as on the line 4—4 of Fig. 3.

As best seen in Fig. 4, the supply fluids at the different temperatures enter the pressure-equalizing chamber 16 from the respective surrounding passages 14, 15 through series of elongated ports 20, 21 circumferentially distributed around the chamber. The latter contains a floating pressure-balancing valve or equalizer element, comprising a central piston 23 and opposed end pistons 24, 25 in fixed spaced relation on a connecting rod 26. The end pistons 24, 25 are adapted to close and open the receiving ports 20, 21 to greater or less extent. Behind or outwardly of the end pistons 24, 25 the terminal spaces of the chamber 16 provide pressure compartments 28, 29 respectively, subject to fluid pressure via passages 28', 29' from an inner portion of the body 10. The incoming fluids, which may be at different pressures as well as at different temperatures, are partitioned in the pressure-equalizing chamber 16 by the central piston 23. Exit ports 30, 31 in the chamber wall at opposite sides of the central piston and subject to restriction or opening by the end pistons 24, 25, pass the separate fluids on into the interior of the body 10, including the passages 28', 29' above mentioned.

It will be understood that movement of the plural piston balancing valve 23—25 in one or the opposite directions correspondingly increases or decreases the open areas of the chamber exit ports 30, 31, as appropriate to equalize the flow pressures thereat. Thus under a greater or a less pressure at either of the inlets 12, 13 the balancing valve automatically shifts in the direction of the lesser pressure until a pressure balance is attained or restored at the ports 30, 31 and beyond them in the body 10.

Figure 3:
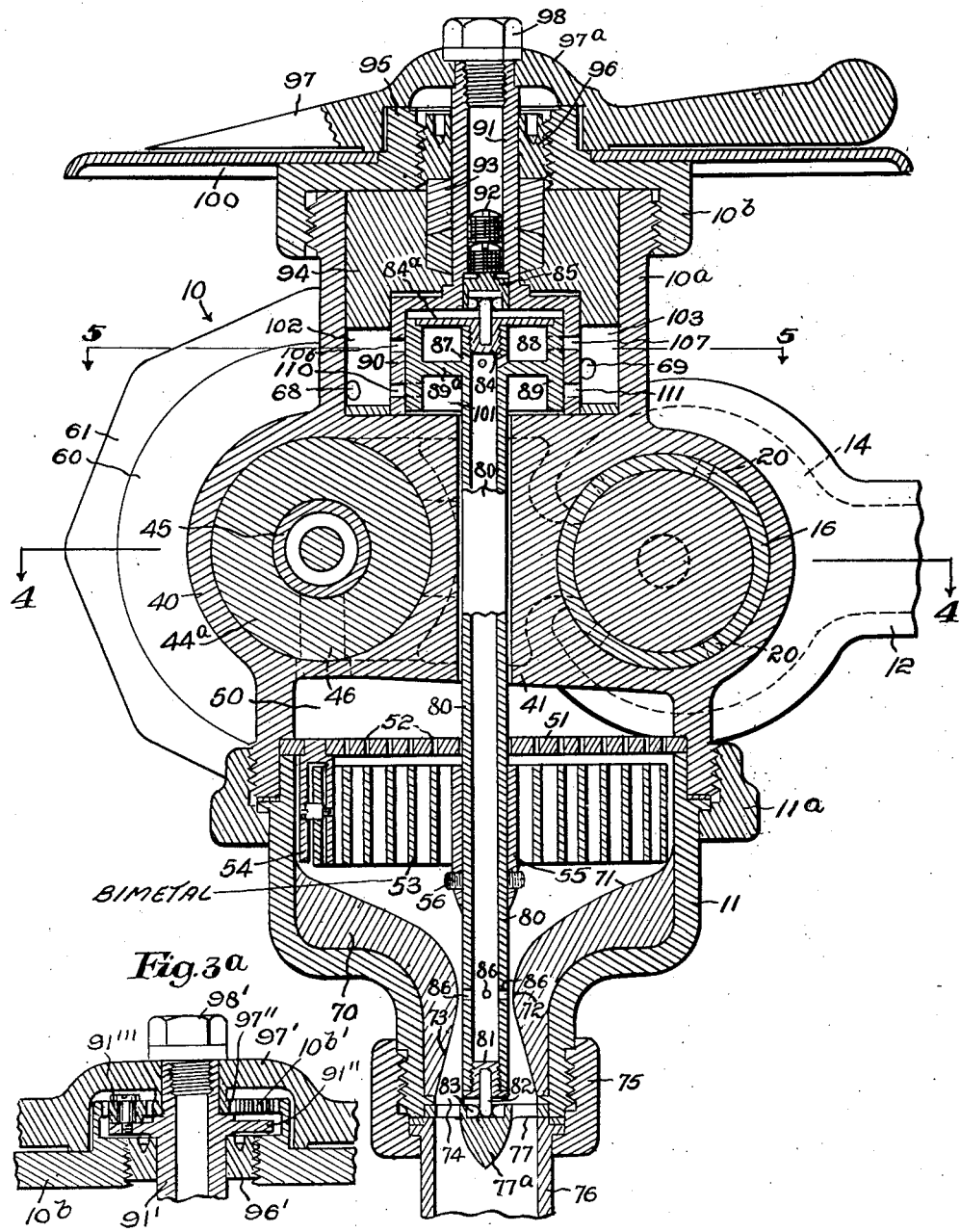
Fig. 3 is a central vertical section, as on the line 3—3 of Fig. 2, with the setting pointer turned 90°.

Referring particularly to Fig. 4, also Fig. 3, the still segregated fluids at equal pressure but different temperature pass via the ports 30 and 31 and corresponding openings 32, 33 in an inner wall portion 34 of the body or casting 10, into the dual supply chamber 40. This comprises hot and cold compartments 42, 43 separated by a hollow central partition 41 integrally joined with the body wall portion 34 and with a partly cylindrical wall 44. The latter together with the laterally opposite outer wall of the casting or body 10 presents a cylindrical housing for a valve sleeve or liner 44a in which the fluid-proportioning piston-valve 45 is slidably received. The liner sleeve 44a and its housing wall are formed with elongated exit ports 46, 47 spaced lengthwise of the valve sleeve for separate passage of the fluids, herein downwardly, to the mixing chamber 50 (Fig. 3) to be described.

The ports 46, 47 are arranged for proportionate opening and closing by the common piston-valve 45. Movement of the latter in one or the opposite direction increases the opening of one port and simultaneously decreases that of the other, correspondingly increasing or decreasing the relative volume of the hot or the cold fluid. Appropriate relative quantities of the fluids of different temperature are thus passed on to the mixing chamber 50 to give the selected resultant temperature for the fluid mixture. Through novel means to be described any selected mixture temperature is maintained irrespective of variations in temperature of the fluid supplies.

The proportioning piston-valve 45 as shown in Fig. 4 is a hollow cylinder having an accurate sliding fit in the sleeve 44a and having a closure plug 45a threaded into one end. At the opposite end the preferably integral end wall of this piston-valve 45 has secured to it the valve stem and piston rod 48 the end of which is fitted through the piston-valve end wall and threaded to receive an anchor nut 48a. The opposite end plug 45a is axially extended within the piston-valve to seat loosely against the valve stem or piston rod 48 and its nut 48a when the parts are assembled. Annular grooves desirably are provided on the outer wall of the piston-valve, as seen in Fig. 4, to aid in freedom of movement.

The fluid supply chamber 40 and its partitioned compartments 42, 43 are closed at the opposite ends by removable closure plugs 49 and 49a. The plug 49 for the compartment 42 is threaded into a transverse wall portion of the casting or body 10 and has a central boss with an axial bore through which the valve stem and rod 48 slidably extend in fitted bearing relation.

In accordance with the invention the power for shifting the proportioning piston-valve 45 in one or the other direction as appropriate to keep the fluid mixture at the desired temperature is derived from the pressure of the fluids themselves, as previously noted. Accordingly the main body 10 further comprises a power or motor chamber 60, in line with the fluid supply chamber 40 and coaxial with the piston-valve 45. This power or valve-operating chamber 60 is accessibly sealed at its outer end as by a closure cap 61.

Within the motor or power chamber 60 and slidably guided on its inner cylindrical wall is the power-applying piston proper 63, movably partitioning the chamber into opposed compartments 64, 65. The outer end of the piston-rod and valve-stem element 48 is centrally connected to the power piston 63, herein detachably, as by fitted extension through it and anchoring by a nut 66 on the projecting threaded end of the rod. Sealing centrally of the piston may be provided as by the concentric flange 63a on the piston threaded to receive a cap-like disk 67 having an inner central portion to contact the rod end and the nut 66, in a generally similar manner as in connection with the piston-valve 45 and plug 45a at the other end of the interconnecting common valve-stem and piston-rod 48.

It will be evident that a pressure differential as between the two compartments 64, 65 of the motor chamber 60 will cause movement of the piston 63 in one or the opposite direction, toward the region of lesser pressure, and so correspondingly move the fluid-proportioning valve 45 to vary the relative volumes of the hot and cold fluids going to the mixing chamber 50. Provision accordingly is herein made for fluid pressure in the piston compartments 64, 65 and for controlling the pressure so as to create a differential as between the two compartments for moving the piston in one or the opposite direction, and at other times when no change in the fluid proportioning is called for to close off the pressure and leave the power piston 63 and consequently the proportioning valve 45 locked at rest. Further, as will later more fully appear, the fluid flow itself also is availed of to create the piston-actuating pressure differential condition, herein through a Venturi action the application of which is in turn thermally governed and regulated by any temperature variations in the fluid mixture.

Figure 5:
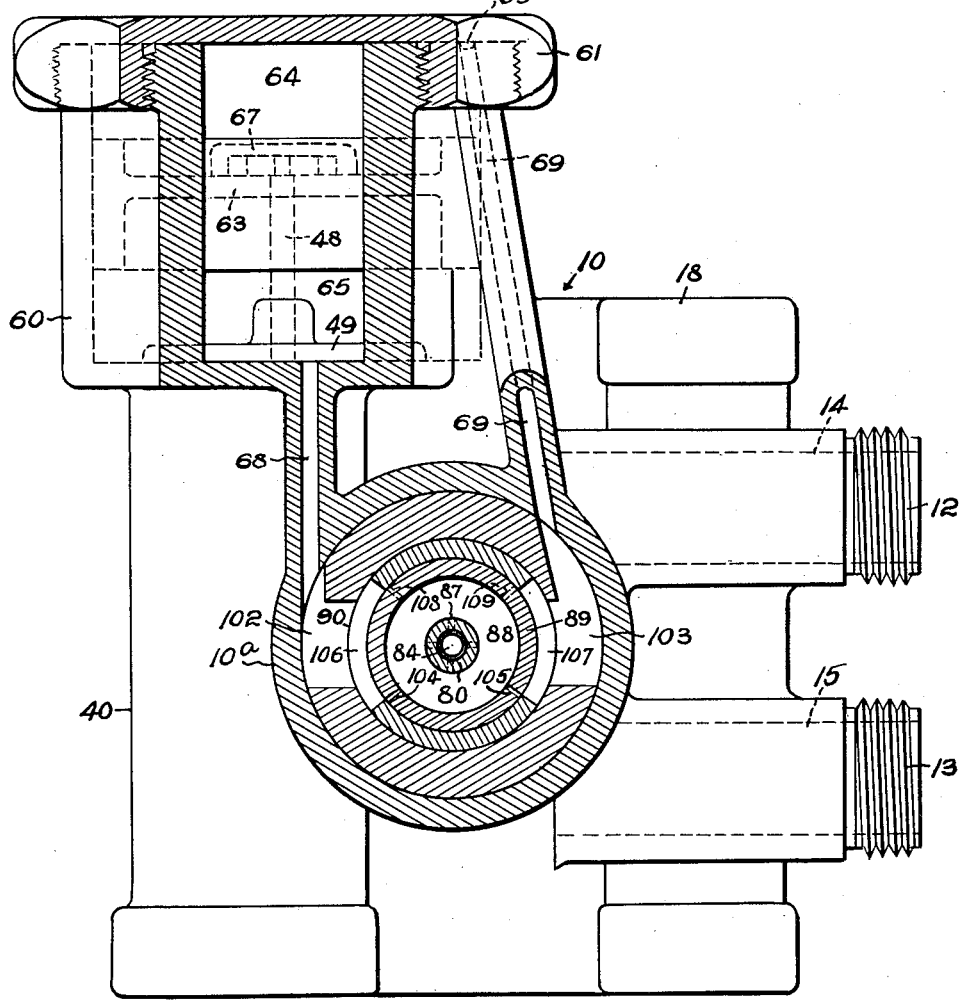
Fig. 5 is a horizontal section nearer the top of the unit, as on the line 5—5 of Fig. 3.

For these purposes the compartments 64, 65 of the motor chamber 60, at the opposite sides of the piston 63 are made accessible to the fluid and fluid pressure, for locking off the piston at times and at other times establishing the pressure differential in one or the opposite direction. This is herein accomplished by means of passages or ducts 68, 69 seen for their full extent in Fig. 5, their entrances appearing also in Fig. 3. These ducts 68, 69 are herein conveniently formed in or on wall portions of the body 10. They lead from the fluid-containing interior of the body 10, herein the vertically extended upper cylindrical portion 10a thereof. This upper body portion 10a is partitioned from the compartments already described, including the pressure-equalizer chamber 16 and the fluid supply chamber 40, by the body walls defining those chambers. Fluid access to the upper body 10a is afforded however through the hollow central vertical wall 41 already referred to; compare Figs. 3 and 4. The tubular passage in said wall 41 extends from the mixing chamber 50 at its lower end up to the upper body 10a, opening into the latter centrally at what is later herein referred to as the normal-pressure chamber 101. The interior of this upper body 10a is transversely divided into two pressure chambers 102 and 103, Figs. 3 and 5, which also are arranged for port-controlled communication with, or shutting off from, the central region of the upper body 10a, including said normal-pressure chamber 101, in a manner to be described. It is from said non-intercommunicating pressure chambers 102 and 103 that the ducts 68 and 69 respectively extend. The duct 68, as best seen in Fig. 5, extends from the pressure chamber 102 through the body wall and opens into the inner piston compartment 65. Correspondingly, the duct 69, also best seen in Fig. 5, leads along the body and the wall of the power chamber 60 to the outer end of the latter where it opens into the outer piston compartment 64. Thus both piston chambers 64 and 65 are fluid filled and accessible to the fluid pressure conditions as determined and controlled by the means later described.

Turning now to the mixing chamber 50 previously mentioned and the parts associated with it, and referring particularly to Fig. 3, said mixing chamber is herein provided centrally in the lower portion of the main casting or body 10, to which the communicating lower shell 11 is attached as by the threaded collar 11a. This mixing chamber and the shell 11 also house the temperature-measuring or thermo-responsive control means and the power-governing or pressure-differential creating means now to be described.

The elongated ports 46, 47 giving exit under the proportioning control of the piston-valve 45 (Fig. 4) are merged together downwardly toward the mixing chamber 50 and enter the latter in a manner to promote commingling of the fluids and to distribute them throughout the relatively large cross-sectional area of said chamber. At an intermediate level in this mixing chamber 50 is a transversely disposed foraminous distributing disk 51 having a multiplicity of relatively small through openings 52, as for example of the size of a .050 in. drill, uniformly distributed in close proximity over the entire area of the disk. The mixing chamber 50 itself is internally shaped and arranged to receive the fluids at different temperatures via the proportioning ports 46, 47 and to aid their commingling and distribution uniformly over the area of the disk 51 and of the adjacent thermostatic means 53, Fig. 3. The distributing disk 51 is removably held between an annular shoulder of the body 10 and the inner end of the shell 11.

The thermostatic means herein comprises a bi-metallic thermo-responsive element 53 illustrated as of the coiled strip type. The outer end of this thermostatic coil is suitably anchored, herein to the perforate distributor disk 51, as by a dependent forked clamp 54. The inner end of the coil is secured to a collar 55 fixed as by set-screws 56 on the rotative thermally-controlled power tube or actuator 80 through the medium of which energy derived from the fluid flow is made available to the motor piston 63, herein as a negative pressure or pressure differential set up for the purpose within the device.

Referring again to the lower portion of Fig. 3, the shell 11 is integrally or otherwise formed internally with a double-conical wall element 70 in the nature of a Venturi tube, concentric with and in effect a downward continuation of the mixing chamber 50. This Venturi device has a relatively large mouth at its upper end 71, conformant to the diameter of the mixing chamber, below which it symmetrically tapers downward along an exponential curve to a passage of minimum cross-sectional area as at 72, there defining a low-pressure region. Beyond the latter in the downward direction the Venturi wall is reversely tapered or flared exponentially as at 73, terminating in a mixture outlet at 74. The shell 11 is reduced adjacent the outlet 74 and is herein externally threaded to receive a coupler 75. The lower end of the shell 11 is concentrically recessed for seating and accurately centering the bottom bearing spider 77 for the power tube 80 above mentioned. The coupler 75 vertically supports said spider 77 and also a flanged outlet sleeve, pipe or the like 76.

This power tube element or actuator comprises the elongated hollow stem, rod or tube 80 vertically disposed centrally in the main body 10 and extending continuously between the lower shell 11 and the upper body portion 10a. Its lower portion passes concentrically through and in spaced relation to the inner wall of the Venturi 70, upwardly through the thermal coil 53 and freely through a central aperture in the distributing disk 51. The tube 80 continues up through and in spaced relation to the wall of the central passage in the vertical partition 41 previously mentioned and on into the hollow cylindrical upper body portion 10a, centrally of the latter.

This tubular element 80 as a whole is rotatively supported and guided at its opposite ends by anti-friction means. At the lower end a threaded closure plug 81 carries an arbor 82 accurately centered in a jewel bearing 83 on the spider 77, the latter including below the bearing a central streamlined tip 77a aiding uniform flow at the outlet. A similar end closure and arbor 84 at the upper end is centered in a jewel bearing element 85 adjustably carried centrally in a rotatively adjustable port-setting element or selector 90 to be described in more detail.

Thus the power tube 80 is supported for rotation about its longitudinal axis, with a minimum of friction, for sensitively turning in one or the other direction by and in accordance with the dictates of the thermo-coil 53. It is here particularly noted that any work to be done by said thermal element 53 is limited to a very low order, requiring only the small effort needed to rotate the tube 80 to the appropriate relatively slight extents, herein never more than a quarter rotation under a maximum change in conditions. Such minute effort is scarcely appreciable and imposes a negligible load on the thermal element 53.

Adjacent the lower end of the power tube element 80 and directly within the low-pressure region 72 of the Venturi 70 a circumferential series of radial openings 86 admit to the hollow interior of the tube. Similarly, at its upper end, the tube 80 has radial openings 87. These admit to an upper annular chamber 88 in a barrel or rotary sleeve valve element 89 concentrically carried by the tube and integrally connected to it by a solid flange 89a. This upper chamber 88, to be referred to as the differential or negative-pressure chamber, is sealed at the top by a flange plate 84a herein integral with the upper end closure plug 84 of the tube 80.

The rotatively adjustable selector previously mentioned comprises a cylindrical skirt 90 concentrically surrounding the sleeve-valve element 89 of the tube 80 and closely conforming to it with clearance such that the tube and its sleeve-valve 89 may turn freely within the skirt. The transverse top wall of the skirt 90 has a tubular central stem 91 at the base of which the upper jewel bearing 85 is held as by screw plugs 92. This selector stem 91 extends up through a packing and gland unit 93 centrally held in a filler disk 94 fitted in the top end of the upper body 10a and centrally recessed at its bottom face to provide a bearing seat for the selector skirt and stem 90, 91.

The upper portion 10a of the body or casting 10 is externally threaded to receive a cover cap 10b having a central upright boss 95 tapped centrally for reception of a bushing plug 96 which takes against the packing gland 93. The plug 96 also provides bearing support for the selector stem 91 which extends rotatively through it and projects sufficiently for attaching a hand lever and pointer element 97. The latter has a hub 97a recessed at its under face to enclose and rotatively seat on the boss 95 of the cover cap 10b and centrally apertured to fit onto the squared and shouldered top end of the selector stem 91 where it is held as by a hex screw 98 tapped into the end of the selector stem.

Figure 2:
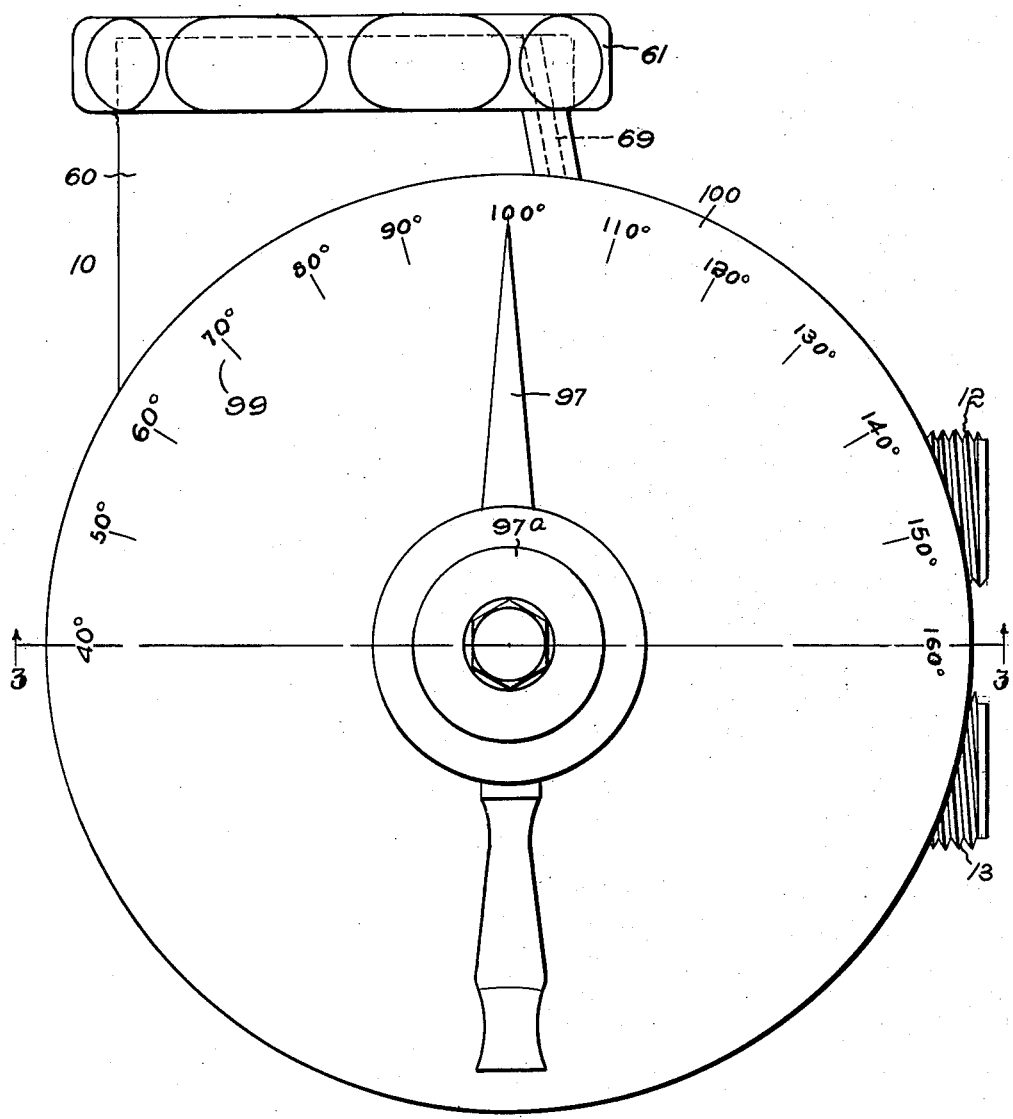
Fig. 2 is a corresponding plan view.

This manual-setting selector-operating pointer 97 is adapted to read against a temperature scale 99, Fig. 2, on a dial plate 100, Figs. 1, 2 and 3, fixed on the cover cap 10b, in determined angular relation to the housing body 10—10a of the device as a whole. The scale 99 may be graduated in any desired units of temperature, such as degrees F. as indicated on Fig. 2. For such uses as shower-bath control the graduation may extend through the widest range likely to be available, as for example between a minimum or cold setting of say 40°, at the left of the scale in Fig. 2, to a maximum of say 160°, at the right in said view. By merely shifting the pointer 97 to stand opposite any desired value between the lower and upper limits the temperature of the mixture at the outlet 74—76 is quickly brought to and automatically maintained at the selected temperature degree, regardless of subsequent variations in the pressures and temperatures of the supply fluids, that is, the hot and cold water supplies in the illustrative example.

The temperature range appearing on Fig. 2 is merely exemplary, representing limits such as ordinarily appropriate for shower-bath installations. It will be understood, however, that the device of the invention is useful for selective automatic temperature control of fluid mixtures over substantially any desired range, as for example between 32° F. and 212° F. for water. In some instances it may be desirable to afford an increased spread for the temperature value units over the given range, for ease in accurate setting of the gauge or pointer such as 97 against the graduated scale. In Fig. 2 a range of 120° F. is indexed over approximately a semi-circle on the dial. The readings may be spread or compacted to any desired extent within the available area of the scale or dial, by providing other than a direct 1 to 1 ratio for the operative connections between the selector skirt element 90 and the pointer-handle member 97.

One such arrangement is illustrated by way of example in the modification shown in Fig. 3a, in this case providing for an increased angular movement of the pointer for a given turning of the skirt, in the ratio of about 2 to 1. In Fig. 3a the stem 91' integral with the skirt 90 extends freely through the pointer 97', and the latter has capacity for turning on and relative to the stem and the retaining screw and washer 98' thereon. The stem has fixed on it a flange 91'' rotatably carrying one or more intermediate pinions 91''' which engages a stationary surrounding ring gear 10b' on the cover cap 10b and a central gear 97'' on and turning with the pointer 97'. The vertical flange of the cover cap 10b and the bushing plug 96' are modified to accommodate the described gearing. Any preferred drive connection other than that of Fig. 3a, as between the selector skirt 90 and the pointer element 97 may be employed, to give an increased or decreased operative ratio.

From the attendant description and by reference particularly to Fig. 3, it will be seen that rotative manual shifting of the temperature-setting pointer-handle element 97 acts to turn the selector skirt 90, outside of and relatively to the sleeve-valve 89 at the upper end of the power tube 80. These valving parts 89 and 90 are formed with certain related ports 104 to 111 (to be described). These ports are adapted to be closed, or to be opened in one or another fashion, at the call of the thermal governor element 53, so as to leave the fluid-proportioning piston-valve 45 (Fig. 4) locked at rest in a given position or to cause it to be moved in one or the other direction thereby increasing the volume of one fluid and decreasing the other.

It will be understood that for any given relative temperature-pressure condition of the "hot" and "cold" supplies there is a certain corresponding position of the piston-valve 45 relative to the proportioning ports 46, 47, at which certain piston-valve position the mixture temperature in chamber 50 will have the desired temperature value. Such piston-valve position will be different under different supply pressures and temperatures. Nevertheless, under any temperature-pressure condition of the supplies, there is one said certain piston-valve position at which the relative volumetric proportioning of the two fluids produces the selected mixture temperature in the mixing chamber and at the discharge outlet 74—76.

The described thermo-element 53 connected to the power tube 80 and through the latter and the ported sleeve and skirt members 89, 90 controlling the actuation of the piston-valve, with a servo or follow-up action more fully explained later, serve to bring the piston-valve 45 to and lock it at said certain position thereof to produce the selected mixture temperature. Said certain position is characterized by a zero pressure differential effective on the piston-valve; and such condition of zero pressure differential is had when the ports 104 to 111 of the skirt 90 and sleeve-valve 89 are so relatively positioned as to close off the negative pressure or pressure-differential-creating influence of the power tube 80 and also the positive or supply-pressure influence.

The main function of the selector skirt 90 is to make it possible to selectively vary the location, angularly about the thermo-coil and power-tube axis, at which said closing-off relation of the skirt and sleeve-valve ports 104 to 111 will occur. The thermo-coil 53 has a certain calibrated position of expansion or contraction for any given temperature value, say 100° F., for the discharge mixture, and by reason of its connection to the power tube 80 the latter has a corresponding angular or azimuthal position. And the action of turning the selector skirt 90 (through its connections with the pointer-handle 97) is to angularly adjust the port closing-off position into conformity with the azimuthal position of the power tube and its sleeve-valve 89 for the given or desired temperature value, as 100° F. in the assumed instance.

Hence a certain angular setting of the pointer 97 will determine and maintain a corresponding temperature value for the fluid mixture passing the thermo-coil 53. From which it is evident that the temperature scale 99 may be calibrated with respect to the pointer (and to the skirt 90 connected in determined angular relation to the pointer) so as to read in terms of selective temperature settings throughout the entire available range. It is so represented in Fig. 2 by way of example.

There remains now to describe the ports 104 to 111 of the sleeve-valve 89 and the surrounding selector skirt 90, and the manner in which the power or actuating force (pressure reduction) derived from the fluid flow by the Venturi means 70–73 is governed with respect to the piston 63 for operating the fluid-proportioning valve 45.

Referring again to Figs. 3 and 5, it has been explained that the opposed piston compartments 64 and 65 communicate respectively with the annular chambers 102 and 103 in the upper body portion 10a, which latter chambers do not communicate with each other. They will for convenience be called the piston-supplying chambers.

The sealed annular chamber 88 at the upper end of the power tube 80, above the integral flange 89a and within the upper portion of the sleeve-valve 89 also has been described. This chamber 88 will be referred to as the energizing or low-pressure chamber. There is continuously present within it, during fluid flow, a reduced-pressure condition due to the low-pressure region 72 of the Venturi means, which region is in communication at all times with the low-pressure chamber 88, through the adjacent ports 86, the interior of the tube 80 and the upper ports 87.

Also within the sleeve-valve 89, at the level below the flange 89a is the previously mentioned annular chamber 101 to which the fluid mixture at normal or supply pressure has access from the mixing chamber 50 and up around the tube 80 through the clearance between it and the central passage in the vertical wall 41 (see Fig. 4). This latter annular chamber 101 is for convenience termed the normal-pressure chamber.

The already-mentioned power-governing port series 104 to 111 is constructed and arranged as follows, in the illustrated embodiment of the invention: The low-pressure chamber 88 has in its valving side wall 89 a pair of relatively minute and preferably rectangular ports 104, 105 substantially spaced apart angularly; see Fig. 5. At a corresponding level the selector skirt 90 has a pair of elongated slot-formed ports 106, 107 (Figs. 3 and 4) of a length not exceeding the spacing of the valve ports 104, 105 and in approximate diametral opposition to each other. Similarly, the normal-pressure chamber 101, below the dividing flange 89a has a pair of small rectangular ports 108, 109 (Fig. 5) and the skirt 90 has at the corresponding level a pair of elongated slotted ports 110, 111, Fig. 3.

Figure 6:
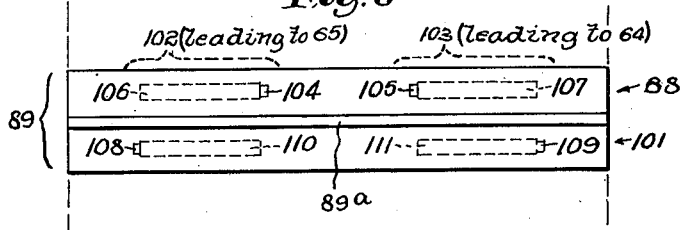
Fig. 6 is a development showing the relation of certain control ports of the actuator means.

While the upper port pairs 104 to 107 and the lower port pairs 108 to 111 may be relatively arranged in various ways to afford the desired close-off and reversing actions, they preferably are shaped, proportioned and relatively disposed as best seen in the partly schematic development view, Fig. 6. This is taken as if looking at the inner face of the sleeve-valve 89, from within the low-pressure and the normal-pressure chambers 88 and 101; the small ports 104, 105 and 108, 109 in the valve wall 89 accordingly are represented in full line, while the elongated ports 106, 107 and 110, 111 on the surrounding selector skirt 90 are indicated in dotted line.

In said Fig. 6 the upper and lower areas, designated at the right by the arrows and numerals 88 and 101 obviously represent the low-pressure and the normal-pressure chambers so numbered on Fig. 3, these being horizontally partitioned by the intermediate flange 89a. The relative locations of the pressure-supplying chambers 102, 103 are indicated by the dotted brackets so numbered, at the top of the figure; these chambers 102, 103 as explained do not intercommunicate and are respectively in fluid-pressure communication with the motor-piston chambers 64 and 65 via the ducts 68 and 69 (Figs. 3 and 5).

As represented in Fig. 6 the entire port series 104 to 111 is in a closing-off status, similarly as in Fig. 5 directly above. The small ports 104, 105 and 108, 109 of the valve 89 are close to but non-opposite the corresponding slot ports 106, 107 and 110, 111 of the skirt 90. Assume now that a relative turning of the parts takes place, such in effect as to shift the small valve ports 104, 105 and 108, 109 to the right in Fig. 6, as would occur under thermally-directed turning of the tube 89 clockwise in Fig. 5 in response to a relative variation in the fluid supply temperatures. The low-pressure valve port 105 then receives a radially-matching open relation with the slot port 107 going to pressure-supply chamber 103 and thence to piston chamber 64, while the low-pressure valve port 104 remains closed relative to slot port 106. At the same time the normal-pressure valve port 108 approximately diametrally opposite the now open low-pressure valve port 105 moves over and opens to the slot port 110 admitting to pressure-supply chamber 102 and thence to the other piston chamber 65, while the normal-pressure valve port 109 remains closed relative to slot port 111. Thus the outer piston-chamber 64 is made subject to the actuating or governing force of the low-pressure chamber 88, and the inner piston-chamber 65 receives the normal-pressure status, creating the piston-energizing differential-pressure condition, in this instance positive as to chamber 65 and negative as to chamber 64. Hence the piston 63 and the connected proportioning valve 45 move outward, toward the top of Figs. 4 and 5. This reduces the open area of the "hot" fluid port 46 and proportionately increases the open area of the "cold" fluid port 47 (Fig. 4), in the example of the illustrative device of the drawings. This particular regulatory actuation obviously is that appropriate for and responsive to some sudden rise in the temperature or pressure of the "hot" supply fluid (e. g. the domestic hot-water supply) or temperature or pressure drop in the other fluid supply (or any relative variation of the fluid supply temperature-pressure conditions such that the algebraic result as to the fluid mixture demands a regulation in mixture-temperature decreasing direction, until the selectively set mixture temperature is restored).

From the foregoing, and particularly by reference to Fig. 6, it will be evident that an oppositely effective supply-fluid temperature variation, such as to cause turning of the sleeve-valve 89 to the left in Fig. 6, will effect an opposite valving status for the entire port series 104 to 111, under which the inner piston chamber 65 is subjected to the low-pressure influence of the chamber 88 and the outer piston chamber 64 is operatively associated with the normal-pressure chamber 101.

Further, it also will be clear that the completely closed-off port status as actually represented in Fig. 6 will be restored when the proportioning piston-valve 45 shall have been brought to the correct position, through the follow-up action of the parts constituting the servo loop, to give the selected mixture temperature under the particular supply-fluid temperature-pressure conditions then existing. Also, for the reasons already explained, it will be understood that there is a complete closing-off status for the port series 104 to 111 for each and every selective mixture-temperature condition throughout the entire minimum-maximum range (e. g. that of the graduated and calibrated temperature-setting scale 99 of Fig. 2), as selectively determined by setting of the pointer-handle 97 and corresponding angular or azimuthal turning of the selector skirt 90 (relative to the tube-carried sleeve-valve 89 and to the corresponding mixture-temperature-determined positional status of the thermo element or coil 53). At the will of the user or operator the temperature setting may be shifted at any time, in either direction and to any extent within the available range for the particular device, merely by turning the pointer 97 to read at the desired mixture temperature value (e. g. 100° F. for the pointer setting as shown on Fig. 2). This setting operation may be visualized with reference to Fig. 6 by considering the dotted slot ports 106, 107 and 110, 111 as being bodily shifted as a unit, in one or the other direction.

It is thought that the follow-up or servo-loop relation of the several parts concerned will be evident from the preceding description in connection with the drawings. The elements entering into the servo-loop are the coil or thermo element 53, the power-applicator tube 80 receiving governing energy from the Venturi means 70—73 and thermo-responsively directing it to (or closing it off from) one or the other of the piston chambers 64, 65 via the valving media 104 to 111, the power piston 63 of said chambers and the volumetric proportioning valve 45. The introductory pressure-equalizer means of compartment 16 in a sense does not take part in the servo-loop, and indeed may be omitted in some instances; however, inclusion thereof tends for uniformity in performance under varying pressure conditions of the fluid supplies, as frequently met in house, apartment and hotel water supplies for example.

The servo or follow-up action is briefly in this manner: On occurrence of a temperature differential in the fluid mixture, above or below the value selectively set by the pointer 97, the thermo element 53 appropriately responds to turn the energizer or power-tube 80 and its sleeve-valve 89 in the corrective direction. The corresponding differential-pressure relation for the piston chambers 64, 65 is thereby established. The proportioning piston-valve 45 is accordingly moved to correctively alter the relative flow quantities of the fluids going to the mixing chamber 50, increasing or decreasing the "hot" volume and oppositely varying the "cold" volume to the like extent, as the situation requires. This proportional variation of the fluids immediately establishes a new temperature for the fluid mixture. That in turn causes a new positioning of the thermo element 53 the effect of which is immediately imposed on the stated operational sequence of the parts in the loop. The described functional cycle continues until the closing-off or neutral status of the energy-governing ports 104 to 111 is re-established, at the temperature selectively set upon the dial.

Thus normally, that is, in a zero-action condition of the device as when the mixture flow is proceeding at the selected temperature, the power piston 63 and the proportioning piston-valve 45 remain locked at rest, subject to the balancing effect of the then equal pressure at the opposite piston faces. In other words, there is at such time a zero pressure-differential at the two ends of the power compartment 60. At such times the means for creating a pressure differential, which means as noted operatively derives from the fluid flow, is inactivated or closed off, as is also the supply pressure, in response to arrival of the selected temperature condition for the mixture flow. At other times, as on occurrence of a temperature change in the supply fluids, or on re-setting of the temperature-selecting means 90—97, the loop-related series of main elements automatically become active. As noted, these include the thermally proportioning piston valve 45 and its power piston 63, the pressure-differential-creating and supplying or governing actuator means 70—80, and the thermal means 53 responsive to the mixture flow temperature. These in accordance with the invention are associated and operatively related in a manner affording a continuous follow-up or servo action as between the outflowing mixture temperature condition and the fluid-proportioning condition, providing an automatically controlled servo-cycle for which the selective setting means determines the zero-action condition.

It is here important to note that in the stated neutral, closing-off or inactive status of the parts the proportioning piston 45 is hydraulically locked in the correct position, by reason of the completely closed condition of all ports 104 to 111 of both the upper and the lower compartments of the governor valve or thermally controlled operator-selective valve system 89, 90. The temperature of the flow mixture accordingly is automatically held at the selected point, without pulsation or "flutter" and constant working of the parts as heretofore experienced with known devices of this general class. Further, the automatic regulation obtained in accordance with the invention, as in the exemplary embodiment of means as herein illustrated and described, is extremely rapid. The entire servo cycle is completed and appropriate correction applied within a period of but a few seconds, even in the presence of abnormal temperature and pressure variations in the supply or on occasions when it is desired to shift quickly from one to another widely separated temperature value, including a jump from one to the other of the limits of the available range. Likewise the regulation is effected within narrow limits at the selected temperature, the temperature of the mixture flow on the average being held within approximately one degree F. plus or minus of that selected.

The synonymous terms "proportional servo" and "follow-up servo" as herein employed are believed and intended to conform with accepted usage as for example in Automatic Control Engineering by Ed Sinclair Smith (McGraw-Hill Book Company, Inc., New York, 1944) wherein by definition a follow-up servo includes follow-up means causing the control to be nearly proportional except for a temporary and usually slight servo lag. Such means usually comprises mechanical linkage whereby, for example, a sudden or step movement of a meter or measuring element produces an initial proportional displacement of a pilot valve and causes an initially proportional speed of travel of the motor piston, so that the latter restores the pilot valve to its neutral position at which travel of the motor piston is proportional with that of the meter. However, within the definition of "proportional servo" or "follow-up servo" and as herein employed the proportional action and attendant stabilizing effect may be, and herein is, had otherwise than through mechanical linkage. Thus in accordance with the present invention as typified by the embodiment herein illustrated and described I obtain a proportional or follow-up relation between my piston and valve element 45—63 on the one hand and my pilot element 89 on the other, largely by reason of the thereby resultant reduction of friction and inertia effects through the medium of my rotary barrel pilot and the attendant calculated timing relation in the responsive action of the parts. Thus for example a sudden or step movement of my temperature-measuring thermostatic element 53 initiates a proportional control action as here referred to; so also, for further instance, does a re-setting of my temperature selector element 90—97.

Further advantages offered by the invention lie in the relatively small number of moving parts, and in the mechanical simplicity and manufacturing ease throughout the entire device. In that connection it is apparent that there are in general but two main machining axes, one the horizontal axis of the longitudinally aligned power or motor compartment 60 and the proportional valving comparting 40, noting Figs. 2, 4 and 5, and the other the vertical axis defined by the power tube 80 and coaxially related parts including those of the venturi 70, the mixing chamber 50 and the upper housing portion 10a, noting particularly Figs. 1 and 3. Contributing to these beneficial results are the facts that no external mechanical or other power feed-back connections are necessary and that the servo-action and the entire operating force is directly and hydraulically derived from the pressure and flow of the fluids themselves, excepting only the negligible effort for the slight automatic regulatory turning of the relatively frictionless tube and governor-valve element 80—89, while even this latter is operated by heat received from or returned to the fluids and their mixture.

My invention either as to method or means is not limited to the particular steps and embodiments as herein shown and described, its scope being pointed out in the following claims.

I claim:

1. In a plural fluid mixture temperature controller wherein fluids of substantially equal pressures and at different temperatures are supplied at separate inlets to a mixing chamber having an outlet for outflow of the fluid mixture at a selectable temperature to be maintained, in combination with such mixing chamber, a proportioning valve for the mixing chamber inlets, an hydraulic piston mechanically connected to the proportioning valve to move it in one and the opposite directions, a thermo-responsive element in the outlet path of the fluid mixture, a low friction and low inertia hollow cylindrical pilot valve rotatable about its generative axis and enclosing separated differential and normal pressure compartments each having a plurality of ports in the peripheral walls, a ported temperature-setting selector sleeve concentrically and rotatively adjustably surrounding the pilot valve, separated pressure chambers adjacently external to the selector sleeve, said selector sleeve and pilot valve and the ports thereof constructed and arranged to afford a neutral, locked or zero position for the pilot valve for each given temperature setting of the selector sleeve and other positions establishing a pressure differential as between said pressure chambers in one or the reverse relation accordingly as the pilot valve is rotated to one or the opposite side of such zero position, passages connecting the respective pressure chambers to opposite sides of the proportioning valve piston, means associated with the fluid flow continuously to create a differential pressure, conduit means admitting the differential pressure to the differential pressure compartment of the pilot valve and continuously admitting normal pressure to the normal pressure compartment of said pilot valve, and said thermoresponsive element being connected to rotate the pilot valve in proportional relation to the position of the proportioning valve in a manner causing corrective response by the pilot valve toward the zero position for the given setting of the selector.

2. A fluid mixture temperature controller according to claim 1 wherein the differential pressure creating means comprises a "Venturi" formation in the mixture flow path.

3. A fluid mixture temperature controller according to claim 1 wherein the cylindrical pilot valve has a reduced coaxial tubular stem extending to the differential pressure creating means and the conduit means admitting the differential pressure to the pilot valve extends through said stem.

4. A fluid mixture temperature controller according to claim 3 wherein the mixing chamber, the outlet thereof, the pressure creating means, the pilot valve and the stem thereof, the selector sleeve and the pressure chambers external to the latter all have a common alignment axis.

5. A fluid mixture temperature controller according to claim 1 wherein the mixing chamber is transversely partitioned by a foraminous distributing and turbulence reducing plate through which the inlet fluids pass, and the thermo-responsive element is disposed between the plate and the chamber outlet.

6. In an automatic temperature control device for mixed fluid flow, a unitary housing having separate inlets for fluids at different temperatures and pressures, a pressure-equalizing chamber and piston means in the housing receiving the inlet fluids and delivering them separately at equalized pressures, a mixing chamber having proportioning inlets for the respective fluids and a delivery outlet for the mixture, a proportioning valve controlling the mixing chamber inlets, a piston chamber and double-acting piston therein for moving the proportioning valve oppositely, a pilot chamber providing separated pressure compartments, passage means in the housing communicating between the respective pressure compartments and the opposite sides of the proportioning valve piston, pressure-differential creating means at the mixture fluid outlet, conduits for communicating the differential pressure and normal flow pressure to the pilot chamber compartments selectively, rotary hollow cylindrical pilot valve means in the pilot chamber and controlling said conduits for operatively relating the differential pressure and the normal flow pressure to opposite sides of the piston in one and the opposite senses and to close them off in a zero action position corresponding to the desired mixture temperature, and thermal-responsive means in the mixing chamber rotatively controlling the rotary pilot valve means in proportional relation to the position of the proportioning valve.

7. In an automatic temperature control device for mixed fluid flow, a mixing chamber for relatively hot and cold fluids, a plural inlet for the respective fluids, pressure equalizing means for said fluids, a final control valve element receiving the fluids at equal pressure from said means and volumetrically proportioning the flow thereof to the mixing chamber, a common outlet from the mixing chamber, a servomotor with follow-up proportional control capacity deriving power internally from the controlled fluid flow of the mixing chamber outlet whereby to position said final control valve element, said motor including a hollow cylindrical rotary pilot valve having a plural-compartment barrel portion for effecting application of the internally derived power in one or the opposite sense to said final control valve element, and a temperature measuring element subject to the mixing chamber fluid and connected with the servomotor thereby to control it in proportional relation to the final control valve element.

8. In an automatic temperature control device for mixed fluid flow, a mixing chamber for relatively hot and cold fluids of substantially equal pressures, a final control valve element proportioning the flow of said fluids to the mixing chamber, an oppositely movable piston for shifting the final control valve element, a flow-subject formation in pressure-differential-creating relation to the fluid flow, a hollow cylindrical rotary pilot valve operating in proportional relation to displacement of said piston and having a barrel portion providing separated compartments subject respectively to the pressure differential and to the flow pressure for thereby applying the pressure differential to the piston in one and the opposite sense, and a thermostatic element subject to the mixing chamber fluid and connected to the pilot valve thereby to effect proportional control connection between the final control valve and the pilot valve.

9. In a mixed fluid flow temperature controller having a housing body incorporating a mixing chamber with plural inlets for fluids of substantially equal pressures and at different temperatures, said chamber having a mixture outlet, in combination therewith a proportioning valve for the mixing chamber inlets, a double-acting piston mechanically connected to the proportioning valve, and a thermally responsive pressure-motivated proportional servo system for the proportioning valve to maintain a selected mixture temperature at the outlet despite temperature variations of the inlet fluids, said system comprising a pilot valve chamber having at spaced portions conduits communicating with opposite sides of the proportioning valve piston, a hollow cylindrical rotary pilot valve in said chamber containing pressure-differentiated compartments and ports communicable therefrom to the respective proportioning valve piston conduits in one and the reverse relation under opposite rotation of the pilot valve and closable by the latter in a predetermined zero-action position thereof corresponding to the selected temperature for the mixture, means in the fluid flow path there creating a differential pressure zone, means affording communication between the differential pressure zone and one compartment of the pilot valve and between the other compartment thereof and fluid at normal pressure, and a thermal coil subject to mixture temperatures in the mixing chamber as determined by the inlet fluid temperatures and the proportioning valve and connected to rotate the pilot valve to call for and effect corrective positioning of the proportioning valve in the event of inlet fluid temperature change and in turn to rotatively restore the pilot valve toward zero-action position for the selected temperature in direct proportional relation to the new position of the proportioning valve.

10. An automatic temperature control device for mixed fluid flow comprising a housing body providing a cylindrical control section with angularly spaced chambers, an intermediate plural-chambered section and a mixing chamber in axial line with the control section and having plural fluid-proportioning inlets, a hollow cylindrically walled pilot valve rotatably disposed concentrically in the control section and having a tubular stem extending through the intermediate body section and the mixing chamber, the latter having a mixture outlet surrounding the pilot valve stem and formed to create a differential pressure zone thereat, the pilot valve being internally partitioned to define therein a differential pressure compartment and a normal pressure compartment, the differential pressure compartment communicating with said differential pressure zone via the tubular stem and radial apertures therein and the normal-pressure compartment communicating externally of the valve stem with fluid in the housing, a cylindrical selector surrounding the pilot valve with capacity for rotative temperature-setting adjustment relative to and independently thereof, the pilot valve wall and the selector having cooperative peripheral ports angularly disposed to open and to close the pressure compartments of the pilot valve with reference to the respective chambers of the control section in a manner providing a neutral, locked or zero position for each temperature setting of the selector and other positions effecting a pressure differential between said control section chambers in one or the reverse relation as the pilot valve is rotated to one side or the other of such zero position, the housing body having plural supply inlets for fluids at different pressures and temperatures, pressure equalizing means in a chamber of the intermediate body section receiving the inlet fluids and separately delivering them at equal pressures to the respective proportioning inlets of the mixing chamber, a proportioning valve controlling said mixing-chamber inlets, a piston chamber and piston therein for operating said proportioning valve, passages connecting the piston chamber at opposite sides of the piston to the respective chambers of the control section, and a thermal-responsive element in the mixture chamber and connected to the pilot valve stem to rotate the pilot valve in proportional relation to the proportioning valve thereby to impose corrective response toward the zero position by the pilot valve.

11. An automatic temperature control device for mixed fluid flow comprising a housing body providing a cylindrical control section with angularly spaced chambers, an intermediate plural-chambered section and a mixing chamber in axial line with the control section and having plural fluid-proportioning inlets, a hollow cylindrically walled pilot valve rotatably disposed concentrically in the control section and having a tubular stem extending through the intermediate body section and the mixing chamber, the latter having a mixture outlet surrounding the pilot valve stem and formed to create a differential pressure zone thereat, the pilot valve being internally partitioned to define therein a differential pressure compartment and a normal pressure compartment, the differential pressure compartment communicating with said differential pressure zone via the tubular stem and radial apertures therein and the normal-pressure compartment communicating externally of the valve stem with fluid in the housing, a cylindrical selector surrounding the pilot valve with capacity for rotative temperature-setting adjustment relative to and independently thereof, the pilot valve wall and the selector having cooperative peripheral ports angularly disposed to open and to close the pressure compartments of the pilot valve with reference to the respective chambers of the control section in a manner providing a neutral, locked or zero position for each temperature setting of the selector and other positions effecting a pressure differential between said control section chambers in one or the reverse relation as the pilot valve is rotated to one side or the other of such zero position, the housing body having plural supply inlets connected to the respective proportioning inlets of the mixing chamber to supply thereto fluids of different temperature and substantially equal pressure, a proportioning valve controlling said mixing-chamber inlets, a piston chamber and piston therein for operating said proportioning valve, passages connecting the piston chamber at opposite sides of the piston to the respective chambers of the control section, and a thermal-responsive element in the mixture chamber and connected to the pilot valve stem to rotate the pilot valve in proportional relation to the proportioning valve thereby to impose corrective response toward the zero position by the pilot valve.

12. In an automatic temperature control device for mixed fluid flow, a mixing chamber for relatively hot and cold fluids, a final control valve element proportioning the flow of said fluids to the mixing chamber, a piston movable in one and the opposite directions for shifting the final control valve element, a flow subject formation in pressure-differential-creating relation to the fluid flow, a hollow cylindrical rotary pilot valve having a barrel portion providing separated compartments subject respectively to the pressure differential and to the flow pressure for thereby applying the pressure differential to the piston in one and the opposite sense, and a thermostatic element subject to the mixing chamber fluid in rotative connection with said pilot valve thereby to effect corrective positioning of said final control valve element.

WALTER J. KRESKE.

REFERENCES CITED

The following references are of record in the file of this patent:

UNITED STATES PATENTS

| Number | Name | Date |
| --- | --- | --- |
| 1,842,358 | Cartier | Jan. 19, 1932 |
| 1,925,352 | Twombly | Sept. 5, 1933 |
| 1,939,970 | Fuess | Dec. 19, 1933 |
| 2,146,273 | Smith | Feb. 7, 1939 |
| 2,172,489 | Young | Sept. 12, 1939 |
| 2,193,581 | Clokey | Mar. 12, 1940 |
| 2,199,416 | Paulson | May 7, 1940 |
| 2,217,017 | Hoopes | Oct. 8, 1940 |
| 2,222,907 | King | Nov. 26, 1940 |